US010782663B2

(12) United States Patent
Fink et al.

(10) Patent No.: US 10,782,663 B2
(45) Date of Patent: Sep. 22, 2020

(54) CONTROL OF A WATER SUPPLY NETWORK

(71) Applicant: Siemens Aktiengesellschaft, Munich (DE)

(72) Inventors: Rafael Fink, Munich (DE); Christoph Moll, Munich (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 16/109,850

(22) Filed: Aug. 23, 2018

(65) Prior Publication Data
US 2019/0064761 A1    Feb. 28, 2019

(30) Foreign Application Priority Data

Aug. 30, 2017 (EP) .................................... 17188473

(51) Int. Cl.
*G05B 19/042* (2006.01)
*G06Q 50/06* (2012.01)
(Continued)

(52) U.S. Cl.
CPC ........... *G05B 19/042* (2013.01); *G05B 15/02* (2013.01); *G06Q 50/06* (2013.01); *E03B 7/02* (2013.01); *G05B 2219/25257* (2013.01)

(58) Field of Classification Search
None
See application file for complete search history.

(56) References Cited

U.S. PATENT DOCUMENTS 4,674,279 A * 6/1987 Ali .......................... F03B 15/14
290/43
2007/0130093 A1  6/2007 Haji-Valizadeh
(Continued)

FOREIGN PATENT DOCUMENTS

WO       2009020402 A1    2/2009

OTHER PUBLICATIONS

Stancel, "Urban Water Supply Distributed Control System", 2008, IEEE 1-4244-2577, pp. 1-5 (Year: 2008).*
(Continued)

*Primary Examiner* — Carlos R Ortiz Rodriguez
*Assistant Examiner* — David Earl Ogg
(74) *Attorney, Agent, or Firm* — Schmeiser, Olsen & Watts LLP

(57) ABSTRACT

A water supply network includes node components and edge components, wherein the edge components transport water between the node components. The edge components is controllable in relation to its flow behavior for water. A method for controlling the water supply network includes the steps of determining a planning horizon, which includes a number of time slices; determining upper and lower limits for feeds and prospective withdrawals of water in the time slices; determining possible operating configurations of the at least one edge component; determining energy costs for an activation of the edge component in the time slices; determining permissible states of node components; determining current states (initial states) of edge or node components; and determining a control plan for the at least one edge component on the basis of the determined information in such a manner that a predetermined water balance is maintained in each time slice averaged over time.

13 Claims, 2 Drawing Sheets

Figure 1:
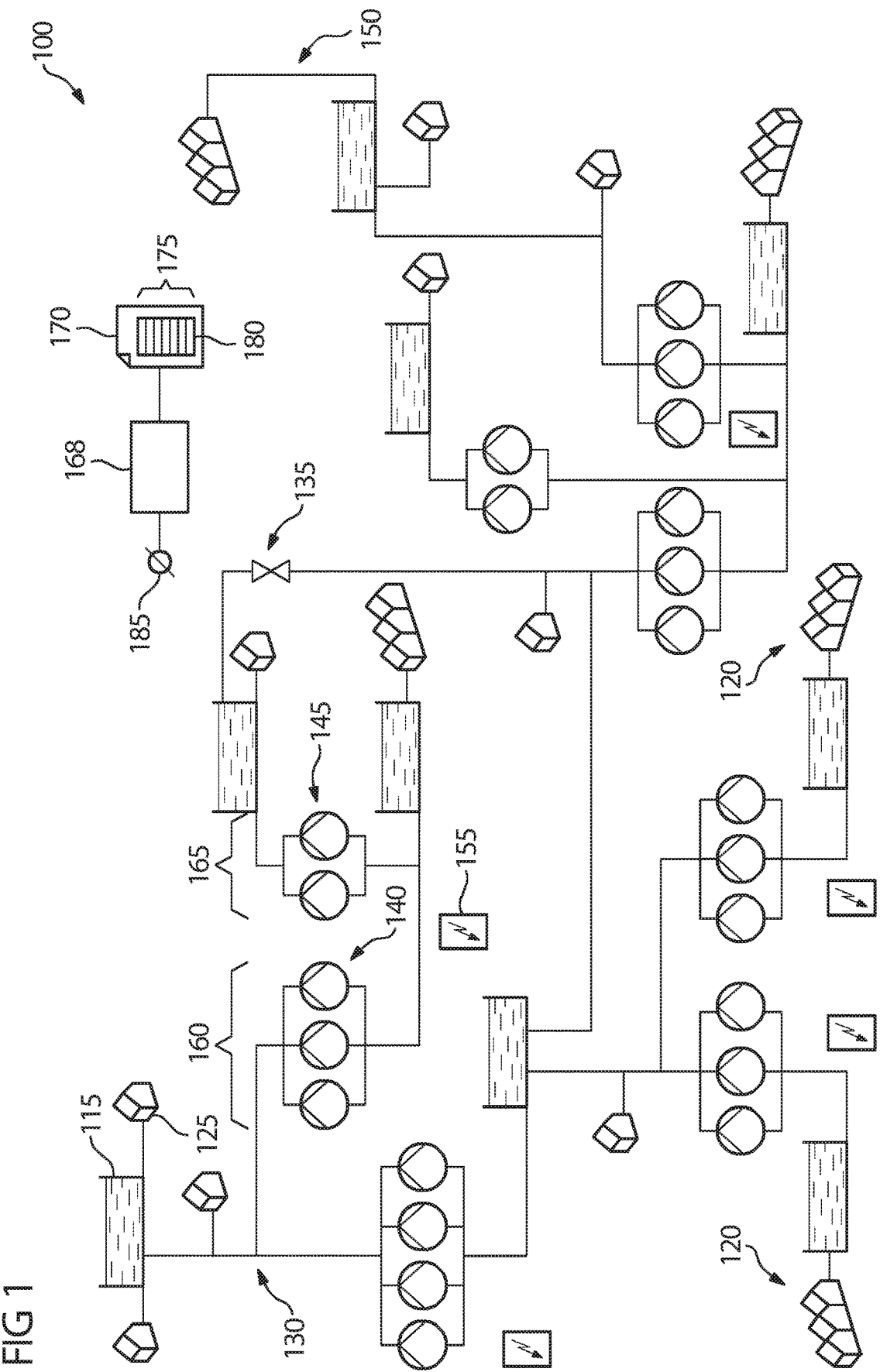

(51) Int. Cl.
G05B 15/02 (2006.01)
E03B 7/02 (2006.01)

(56) References Cited

U.S. PATENT DOCUMENTS

2017/0090440 A1    3/2017  Eck et al.
2017/0159270 A1*   6/2017  Garg ................... G01F 15/063

OTHER PUBLICATIONS

Bene József Gergely: "Pump Schedule Optimisation Techniques for Water Distribution Systems", ACTA Universitatis Ouluensis Technica C 472, XP055415987, http://jultika.oulu.fi/Record/isbn978-952-62-0266-2 ISBN: 978-952-6202-66-2, gefunden im Internet: URL:http://jultika.oulu.fi/files/isbn9789526202662.pdf, gefunden am Oct. 16, 2017, paragraph 1.3.1; pp. 27, 30; 2013.
European Examination Report for Application No. 17188473.7, dated Feb. 4, 2020.

* cited by examiner

CONTROL OF A WATER SUPPLY NETWORK

CROSS-REFERENCE TO RELATED APPLICATIONS

This application claims priority to European application No. EP17188473.7 having a filing date of Aug. 30, 2017, the entire contents of which are hereby incorporated by reference.

FIELD OF TECHNOLOGY

The following relates to a water supply network. In particular, embodiments of the invention relate to the control of components of a water supply network.

BACKGROUND

A water supply network is adapted to supply a plurality of private and/or commercial users with water. The water supply network can be modeled by distinguishing between node and edge components, wherein the water is transported via the edge components between node components. Node components can comprise feeders such as wells, sources, or external water suppliers; water consumers; water containers, possibly tanks or basins; and water supply or collecting points. Edge components can be represented by pipes, pumps, or valves.

The water supply network is controlled by influencing the flow of water through the individual components. In this case, numerous auxiliary conditions need to be taken into account. For example, specific components can be controlled in an analog manner, others only in a binary manner. Specific combinations of activations of a plurality of components can be impermissible. In order to operate the water supply network economically, in general as uniform as possible control of the components is advantageous. For example, an energy requirement can be minimized if a pump is operated permanently at moderate speed instead of being operated periodically at high speed and switching off again. In particular, overall costs should therefore be minimized, which comprise the energy costs and the switching costs, and at the same time the water supply for the consumers should be ensured.

Existing planning systems for the control of a water supply network are frequently based on simplified models, which for example do not take into account any only integer state or decision variables. A control scheme determined to such an extent can require the additional application of a heuristic in order to be able to implement the calculated plan for the control of the components permissibly. For example, a valve can be affected, which can only be either open or closed. A fractional variable for the state of the valve must then be adapted. Frequently other variables must subsequently also be adapted in order to compensate for the effect introduced by the adaptation.

SUMMARY

An aspect relates to providing an improved technique for controlling a water supply network.

A water supply network comprises node components and edge components, wherein the edge components transport water between the node components. At least one of the edge components is controllable in relation to its flow behavior for water. A method for controlling the water supply network comprises the steps of determining a planning horizon, which comprises a number of time slices; determining upper and lower limits for feeds of water into the water supply network in the time slices; determining prospective withdrawals of water from the water supply network in the time slices; determining possible operating configurations of the at least one edge component; determining energy costs for an activation of the at least one controllable edge component in the time slices; determining permissible states of node components of the water supply network; determining current states (initial states) of components of the water supply network; and determining a control plan for the at least one controllable edge component on the basis of the determined information in such a manner that a predetermined water balance of the water supply network is maintained in each time slice averaged over time. The control plan comprises a time sequence of activations of the at least one edge component. In this case, the control plan allows a transition between different activations of the at least one edge component only once in each time slice and once at a transition from one time slice to the following time slice. The transition can in particular comprise a switching or a change of an operating configuration of an edge element.

An operating configuration preferably comprises the configuration of an edge component of the water supply network. The configuration can in particular comprise an activation state of a controllable component and furthermore an energy intake of the edge component or a flow through the edge component. The operating configuration of the water supply network can comprise operating configurations of all edge components.

A controllable edge component can be active, wherein it is activated and receives energy, or not active or passive, wherein it is not activated and receives no energy. A transition from the active into the passive state or conversely is called switching or switching process. A switching can also comprise a transition between two active operating configurations, which in particular are assigned to variously large energy intakes.

Embodiments of the invention are based on the finding that for efficient and economical control of the water supply network it is not only necessary to ensure the supply of consumers with water and minimize an energy consumption for a controllable component but it is also advantageous to protect an edge component as far as possible by minimizing its switching processes. The component can have a, for example, electric drive and in particular comprise a pump or a similar device. The electric drive can, for example, comprise an asynchronous motor, which has an appreciable power, for example in the range of several tens of or several hundred kilowatts. When switching on the asynchronous motor, there is a slippage of 100% between a magnetic and a mechanical rotational speed and a large proportion of the slippage can be converted into heat instead of into torque. The electric drive of the component can therefore be thermally stressed during each switch-on so that its lifetime can be reduced. The lifetime of the edge element can be significantly lengthened by minimizing switching processes.

The method can provide a coarse planning in the form of the control plan, wherein actual control of the water supply network can be carried out as a function of technical parameters, in particular an actual inflow or outflow of water and possibly a level state of a water container. The planning horizon can, for example, be one or more days and a time slice can, for example, be one hour.

The further transitions between different activations of a plurality of edge components preferably take place simultaneously. As a result, it is possible to adhere to auxiliary conditions, which is predefined by the configuration or architecture of the water supply network. For example, the switching on of a pump can bring about a water flow into a node component, which is connected to another controllable edge component and therefore should also be activated.

The control plan can be created for a plurality of controllable edge components, wherein the time sequences of the activations of the edge component are coordinated. As a result, the movement of water through the water supply network can be reflected in an improved manner by the activation of the controllable edge components.

The control plan can be determined in such a manner that a quantity of water stored in a time slice at one node component corresponds to the quantity of water stored in the node component in a preceding time slice plus an inflowing quantity of water and minus an outflowing quantity of water. These and other auxiliary conditions can easily be incorporated in the determination of the control plan. In practice, many auxiliary conditions can be formulated, which can ensure that the control plan can be used directly for controlling the water supply network and the intermediate step of an adaptation or validation is not necessary.

The possible states or state combinations of the edge and/or node components can model physical conditions or limiting values, within which the water supply network can be operated. For example, limits on the flow rates of the pumps in the respective state and the relevant energy consumptions can be coupled or limits on the container filling levels in each case for each time slice.

An operating configuration preferably comprises a permissible flow rate of water and a permissible energy consumption of a controllable edge component.

The node components can comprise a tank and a state of the tank can relate to an interval of permissible filling levels. The storage function of a tank can thus be modeled or utilized in an improved manner.

The at least one edge component can comprise an active device, the energy intake of which is dependent on its activation and wherein the control plan is determined in such a manner that the sum of the energy intakes of all the edge components is as small as possible over the entire planning horizon. Operating costs of the edge components can thus be further reduced.

The control plan can be determined in such a manner that costs which are assigned to switchings of an edge component are minimized as far as possible. Maintenance costs for the controlled edge component can thus be further reduced.

The at least one edge component can comprise an active device whose energy intake is dependent on its activation. The control plan can be determined in such a manner that the sum of the energy intakes of all the edge components is as small as possible over the entire planning horizon. The economic viability of the water supply network can thereby be increased. Furthermore, the lifetime of an edge component can also be increased by a protective operating mode with few switchings.

A plurality of controllable edge components can comprise active devices and the time sequences of the activations of the edge components can be determined such that a total power of the active edge components does not exceed a predetermined power. It can thereby be taken into account that an energy supply usually allows the simultaneous operation of only a subset of the edge components. If the power rating of the power supply network were to be exceeded, a switchoff could take place so that the connected edge components can no longer be operated.

The at least one controllable edge component can comprise an active device, whose energy intake can be negative. Such a device can in particular be a turbine. Other node or edge elements can also be easily modeled on the basis of the given definitions. The method can thus also be used on a complex or non-standard water supply network.

The control plan can in particular be determined by means of a mixed integer linear program. Powerful solution devices ("solvers") are provided for such a program, which usually run as a program on a commercially available computer. The solution devices allow a rapid and efficient search for an optimized solution within a very large search area. In this case, arbitrary optimization criteria or auxiliary conditions can be taken into account, which can be described in the form of linear functions. If nonlinear auxiliary conditions should be used, the solver must be suitably selected for this (MINLP: Mixed Integer Nonlinear Programming), for which however a considerably greater computing power or a correspondingly longer search time can be necessary, so that this is frequently not practical in practice.

Assuming sufficient computing power or running time, an existing optimal solution can always be found. A less good solution can already be found beforehand, which can be improved by further optimization. For a specific solution it is usually known how far its quality is removed from a theoretically attainable quality ("gap"). A decision between the accepting of a prepared solution—or a prepared control plan—and a further optimization can thus be made in an improved manner.

A device for controlling the above-described water supply network comprises a processing device, which is adapted to perform a method described herein. The device can advantageously be used to provide a control plan, on the basis of which the water supply network can then be controlled. In this case, the determination of the control plan can be made independently of an operating control of the water supply network. Different control devices can thus be better adapted to their respective purposes.

The device can further comprise an interface for connection to the at least one edge component, wherein the processing device is adapted to activate the edge component depending on the specific control plan. The device can also take over the actual control of the water supply network, wherein usually not only the control plan is executed but the control is carried out within the framework of the specifications of the control plan and as a function of current parameters of the water supply network. Cost- and wear-optimized control of the network can thereby be brought about effectively.

BRIEF DESCRIPTION

Figure 2:
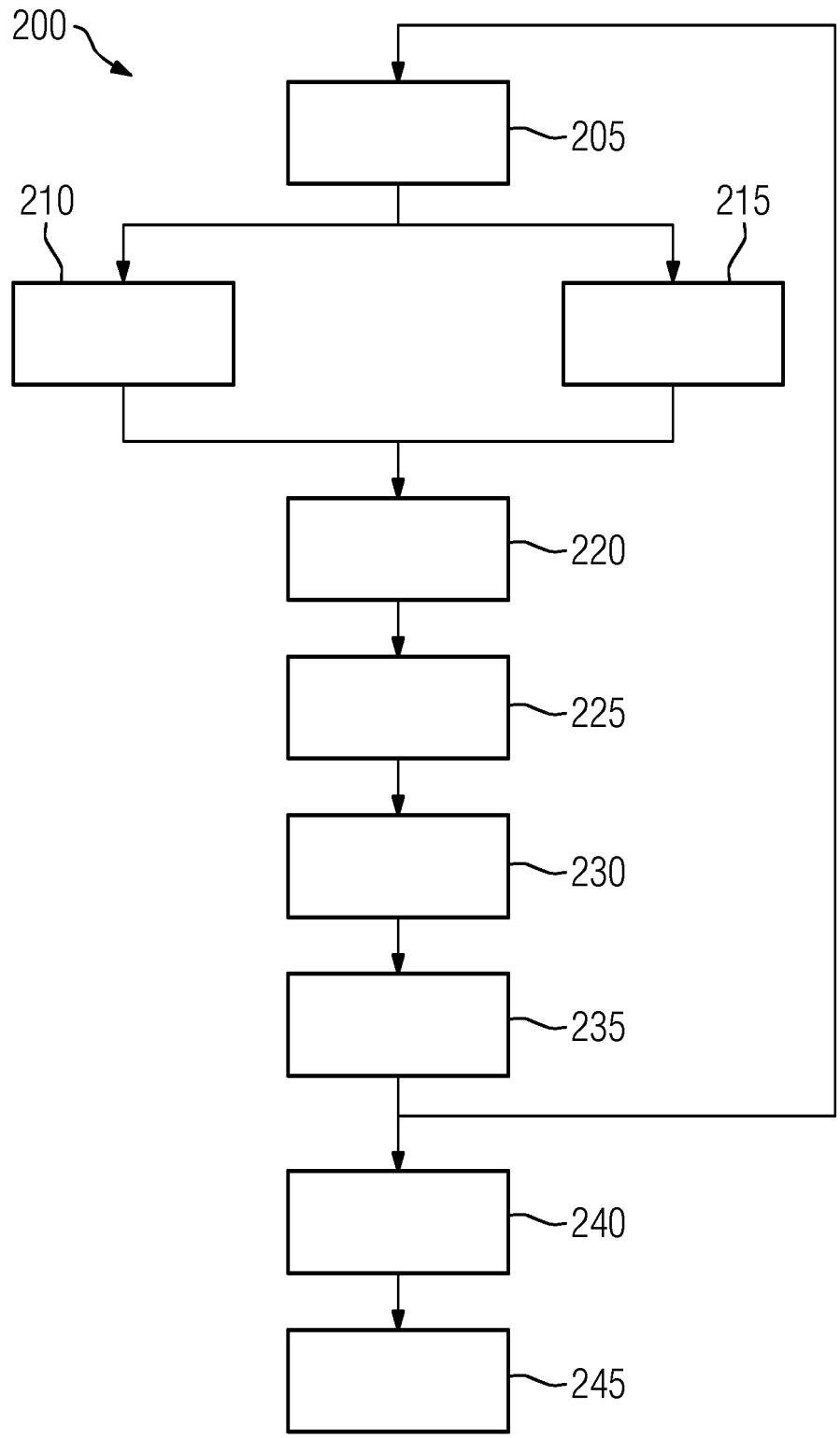

Some of the embodiments will be described in detail, with reference to the following figures, wherein like designations denote like members, wherein:

FIG. 1 shows an exemplary water supply network; and
FIG. 2 shows a flow diagram of an exemplary method for controlling a water supply network.

DETAILED DESCRIPTION

FIG. 1 shows a water supply network 100, which for example can be a communal supply network for supplying with drinking water or industrial water. The water supply network 100 comprises node components and edge components, wherein one edge component transports water between two node components.

Exemplary node components comprise a tank 115, a water feeder 120, a water consumer 125, and a water distribution point 130. The water feeder 120, also simply called feeder 120, usually comprises a well, a source, or a transfer point from another water network. A water volume, which flows per unit time out of a feeder 120 into the water supply network 100, can usually not be influenced or only between predefined limits. A water consumer 125 usually relates to an end consumer, possibly a private household, an industrial facility, or a public withdrawal point. How much water is withdrawn by water consumers 125 from the water distribution network 100 can be at least approximately predicted beforehand, but an actual withdrawal can always differ from a prediction. A water distribution point 130 has n connections for edge components and is also called n-distributor or n-piece, wherein n is usually ≥2. A T-shaped water distribution point 130 can, for example, also be called 3-distributor or 3-piece.

An edge component can be controllable and in particular comprise a valve 135, a pump 140, or a turbine 145, or be not controllable and possibly comprise a pipeline 150. Among the controllable edge components, there are usually those which take in energy depending on their activation, in particular a pump 140, and those which only take in energy during an adjustment, possibly a valve 135 or are completely passive such as the pipeline 150. A pump 140 can only be switchable, i.e. can either be activated in a first operating configuration so that it works and takes in energy or it can be not activated in a second operating configuration so that it does not operate and does not take in any energy. A pump 140 which can be controlled in a multistage or analog manner in respect of its performance can also be provided. In this case, the pump 140 can have more than two operating configurations. The performance of the pump can be accomplished by controlling an in particular electric drive or for example by means of the control of a coupling element such as a hydrodynamic torque converter. Continuously controllable pumps 140 can also be modeled and activated by range specifications for flow and energy intake in arbitrarily many different operating configurations.

A pump 140 can be fed by an energy supplier 155, which usually comprises a connection or transfer point of an energy supply network. In some cases, the energy supplier 155 can, for example, also comprise a local generator or another energy converter. A plurality of pumps 140 can be combined in a pump station 160. In this case, the pumps 140 can be configured to be of the same type, i.e. having the same pumping direction and pump power or different pumps 140 can be logically or physically combined. A turbine 145 operates substantially inversely to a pump 140, i.e. converts water flow into mechanical or electrical energy. A plurality of turbines 145 can be combined in a turbine station 165, which can be formed similar to a pumping station 160.

A control device 168 is provided to determine a control plan 170. The control device 168 preferably comprises a processing device, which can be designed in particular as a programmable microcomputer. The control plan 170 comprises a time sequence of activations of at least one controllable edge component of the water supply network 100, in particular an edge component, which, depending on its activation, takes in energy like a pump 140. In this case, the control plan 170 is preferably a coarse planning, i.e. does not specify all aspects of the control of the water supply network in advance but initially creates only framework conditions, on the basis of which control can be performed subsequently depending on current parameters of the water supply network 100, in particular on the basis of actual withdrawals, actual inflows, and actual level states in tanks 115.

The control plan 170 preferably relates to a predefined planning horizon 175, which can be divided into individual time slices 180. The planning horizon 175 can, for example, comprise one or more days, wherein a time slice 180 can, for example, be one hour. The time slices 180 are preferably the same length and completely fill the planning horizon 175. The planning horizon 175 always extends into the future so that with the advent of a time slice 180 a new time slice 180 can be formed in the most distant future within the planning horizon 175. The control plan 170 can be determined only for the respective newly added time slice 180 or always for all time slices 180 of the planning horizon 175.

The water supply network 100 can be controlled on the basis of a specific control plan 170. In one embodiment, one or more dedicated control devices are provided for this purpose, which in particular can be arranged in a decentralized manner and for which preferably in each case at least one portion of the specific control plan is provided. In another embodiment the control device 168 comprises an interface 185 for connection to at least one of the controllable edge components and is adapted to provide a suitable control signal to the edge component via the interface 185.

FIG. 2 shows a flow diagram of a method 200 for controlling a water supply network 100 like that of FIG. 1. Individual steps of the method 200 can be implemented in a different sequence from the specified sequence.

The method 200 can in particular be implemented completely or in parts on the control device 168. To this end, the control device 168 can comprise a programmable microcomputer or microcontroller and the method 200 can be provided at least in part in the form of a computer program product with program code means. The method 200 is closely connected to the control device 168 so that features or advantages can be transferred from the method 200 to the device 168 or conversely.

In one step 205 preferably the planning horizon 175 and the time slices 180 are determined. This determination can be repeated in subsequent runs through the method 200 or the previously determined result can be taken over.

In a step 210 preferably feed limits of the water feeders 120 are determined. In particular, an upper and a lower limit can be determined, either for all the water feeders 120 or for a group or an individual water feeder 120. Parallel to this, preferably withdrawals by water consumers 125 are determined or predicted. The prediction can be determined in particular on the basis of historical values or parameters such as an expected temperature or. The determinations of steps 210 and 215 are preferably carried out for each of the time slices 180.

In a step 220 possible operating configurations can be determined. In this case, an operating configuration preferably comprises the configuration of an edge component of the water supply network 100. The configuration can in particular comprise an activation state of a controllable edge component and furthermore an energy intake of the edge component or a flow through the edge component. The entirety of all the possible operating configurations of all the node components can logically reflect the structure or architecture of the water supply network 100.

In a step 225 energy costs can be determined. These can be dependent on a time point so that they can be determined individually for the time slices 180. Optionally energy costs from different suppliers can also be determined so that subsequently a favorable supplier can be selected. The energy costs are relevant for the energy which, for example, is taken in by a pump 140, when it is actuated or activated in order to convey water between node devices of the water supply network 100.

In a step 227 states of node components per time slice can be determined. The node components can in particular comprise a tank 115 and the state of the tank can relate to permissibility limits for its filling or level state, e.g. maximum container volume or minimum filling level.

In a step 230 initial states of components of the water supply network 100 can be determined. As a result, an operating state of the water supply network 100 can be reflected. The initial states can, for example, comprise activations of components, positions of valves, or level states of tanks 115.

The steps 205 to 230 substantially relate to determining information which is required for the actual provision of a control plan 170. In principle, steps 205 to 230 can also be carried out in parallel or in an arbitrary sequence.

On the basis of the collected information, the control plan 170 can be determined in a step 235. Preferably the control plan 170 comprises all the previously specified time slices 180. The specific determination of the control plan 170 is preferably accomplished as an optimization within a search area, which is predefined by the above-described limitations. The optimization can in particular be carried out by means of a mixed integer program, as will be explained in more detail hereinafter.

In a step 240 the specific control plan 170 can be provided, for example by relaying this in parts or completely to a control device for controlling the water supply network 100. Alternatively the control plan 170 can also be output to a person for monitoring or as reference, for example in numeric or graphic form.

In a step 245 the control plan 170 can be carried out, in particular within the framework of a current time slice 180, by controlling the water supply network on the basis of the control plan 170. The control can be accomplished by means of the device 165 or another device. Parallel to this, a further coarse planning can be carried out, by running through the method 200 again.

An embodiment of the method 200 for controlling a water supply network will be explained in detail hereinafter. In this case, a mathematical notation is used, which in particular is suitable for implementation by means of a mixed integer program, which for example can be solved with the aid of a commercial solver such as, for example, Scip, CPLEX or Gurobi in order to obtain optimized values for the variables of the model as the planning result. Mixed integer linear programs can easily be extended and adapted, for example, by additional auxiliary conditions.

Designations

For the definition of the mathematical model we introduce the following designations.

Sets (identifiers: upper case Latin letters)

$T=\{t_1, t_2, \ldots, t_n\}$ Set of overlap-free and directly adjacent time slices into which the planning horizon is divided; the indices correspond to the relevant temporal sorting of these time slices, i.e. $t_1$ designates the first time slice, $t_n$ designates the last.

V Set of node components v in the water network (i.e. set of all the tanks, water feeders, water consumers, water distribution points etc.)

E Set of edge components e in the water network (i.e. set of all the pumps, valves, pipelines etc.)

$E_v^+$ Set of all the edge components e entering into the node component v, i.e. when there is positive flow through the edge component e the water flows into the node component v $E_v^-$ Set of all the edge components e flowing out of the node component v, i.e. when there is a positive flow through the edge e, the water flows out from the node v $E_v$ Set of all the edge components incident with the node component v, i.e. $E_n = E_v^+ \cup E_v^-$ $C_e$ Set of all the technical configurations c, in which the edge component e can be operated. A configuration in this case specifies a lower and an upper limit for the permissible flow rates (cf. parameters introduced below $\phi_{e,c}^{min}$ and $\phi_{e,c}^{max}$)

Parameters (identifiers: Greek lower and upper case letters)

$\tau_t$ Duration of time slice t (measured in s)

$\theta_t^{-1}$ Time slice immediately preceding the time slice t $(t \in T \setminus \{t_1\})$, i.e. $\theta_{t_2}^{-1} = t_1$ $\sigma_{v,t}^{min}$ Minimum permissible stored water volume (measured e.g. in m$^3$) in the node component v during the time slice t and in particular also at the end of the time slice t; for all node components which are not tanks it always holds that $\sigma_{v,t}^{min} = 0$ $\sigma_{v,t}^{max}$ Maximum permissible stored water volume (measured e.g. in m$^3$) in the node component v during the time slice t and in particular also at the end of the time slice t; for all node components which are not tanks it always holds that $\sigma_{v,t}^{max} = 0$ $\sigma_v^{ini}$ Initially (i.e. at the beginning of the planning horizon) stored water volume (measured e.g. in m$^3$) in the node component v; for all node components which are not tanks it always holds that $\sigma_v^{ini} = 0$ $\rho_{v,t}^{min}$ Minimum water consumption rate (measured e.g. in m$^3$/s) for the node component v during the time slice t. For water consumers this value is always positive, for water feeders on the other hand it is negative. For negative values the logic of "min" and "max" is reversed. For tanks and water distribution points it always holds that $\rho_{v,t}^{min} = 0$ $\rho_{v,t}^{max}$ Maximum water consumption rate (measured e.g. in m$^3$/s) for the node component v during the time slice t (for water consumers this value is always positive, for water feeders on the other hand it is negative). For negative values the logic of "min" and "max" is reversed. For tanks and water distribution points it always holds that $\rho_{v,t}^{max} = 0$ $\kappa_e^{ini}$ Initial operating configuration of the edge component e $\phi_{e,c}^{min}$ Minimum water flow rate (measured e.g. in m$^3$/s) through the edge component e in the operating configuration c (negative values here characterize a water flow contrary to the orientation of the edge orientation; if one wishes to avoid this, $\phi_{e,c}^{min}$ must consequently be selected to be non-negative)

$\phi_{e,c}^{max}$ Maximum water flow rate (measured e.g. in m$^3$/s) through the edge component e in the operating configuration c $\omega_e^{sw}$ Cost rate per switching of the edge component e ($\neq 0$ only for pumps)

$\omega_{e,t}^{en}$ Cost rate per kWh of energy consumed during operation of the edge component e during the time slice t $\pi_{e,c}^{min}$ Minimum electrical power (measured in kW) of the edge component e in the operating configuration c, which accumulates together with the minimum flow rate $\phi_{e,c}^{min}$; for valves and pipes it always holds that $\pi_{e,c}^{min} = 0$ $\pi_{e,c}^{max}$ Maximum electrical power (measured in kW) of the edge component e in the operating configuration c, which accumulates together with the maximum flow rate $\phi_{e,c}^{max}$; for valves and pipes it always holds that $\pi_{e,c}^{max} = 0$ Variables (identifiers: lower case Latin letters)

$0 \leq d_{e,t,c}^1 \leq \tau_t$ Variable for the duration (measured in s) in which the edge component e is operated in the state configuration c before the potential switching process of the component in time slice t (e∈E, t∈T, c∈$C_e$)

$0 \leq d_{e,t,c}^2 \leq \tau_t$ Variable for the duration (measured in s) in which the edge component e is operated in the state configuration c after the potential switching process of the component in time slice t (e∈E, t∈T, c∈$C_e$)

$0 \leq s_t \leq \tau_t$ Variable for the potential switching time (measured in s) of the edge components during the time slice t (t∈T). Since the switchings for all edge components incident with a node component v must take place simultaneously and we are only considering cohesive water networks without restricting the generality, the potential switching time for all edge components is always the same. The variable is therefore not dependent on e $f_{e,t,c}^1$ Variable for the water flow (measured e.g. in m³) through the edge component e before the potential switching process of the component in time slice t in the operating state configuration c (e∈E, t∈T, c∈$C_e$)

$f_{e,t,c}^2$ Variable for the water flow (measured e.g. in m³) through the edge component e after a possible switching process of the component in time slice t in the operating state configuration c (e∈E, t∈T, c∈$C_e$)

$g_{e,t,c}^1$ Variable for the energy consumption (measured in kWh) of the edge component e before a possible switching process of the component in time slice t in the operating state configuration c (e∈E, t∈T, c∈$C_e$); the energy consumption $g_{e,t,c}^2$ is in this case correlated with the relevant water flow $f_{e,t,c}^2$ $g_{e,t,c}^2$ Variable for the energy consumption (measured in kWh) of the edge component e after the potential switching process of the component in time slice t in the operating state configuration c (e∈E, t∈T, c∈$C_e$); the energy consumption $g_{e,t,c}^2$ is in this case correlated with the relevant water flow f $k_{e,t,c}^1 \in \{0,1\}$ Binary variable for the decision in which state configuration c the edge component e is operated before the potential switching process of the component in time slice t (e∈E,t∈T,c∈$C_e$); in the case $k_{e,t,c}^1=1$ the configuration c is active before the potential switching process, otherwise another configuration c'≠c $k_{e,t,c}^2 \in \{0,1\}$ Binary variable for the decision in which state configuration c the edge component e is operated after the potential switching process of the component in time slice t (e∈E,t∈T,c∈$C_e$); in the case $k_{e,t,c}^2=1$ the configuration c is active after the potential switching process, otherwise another configuration c'≠c $0 \leq m_{e,t} \leq 1$ Indicator variable, which indicates whether a switching process occurred or not during the time slice t at the edge component e (e∈E, t∈T). If yes the variable automatically assumes the value 1 as a result of the auxiliary conditions, if no, the value 0. The variable therefore need not explicitly be declared as binary $0 \leq n_{e,t} \leq 1$ Indicator variable, which indicates whether a switching process occurred or not during the time slice transition from the preceding time slice $\theta_t^{-1}$ to the time slice t at the edge component e (e∈E, t∈T\{$t_1$}). If yes the variable automatically attains the value 1 as a result of the auxiliary conditions, if no, the value 0. The variable therefore need not explicitly be declared as binary $u_{v,t}^1$ Variable for the water consumption (measured e.g. in m³) in the node component v before the potential switching time point during the time slice t (v∈V, t∈T); a negative value for $u_{v,t}^1$ therefore corresponds de facto to a water feed.

$u_{v,t}^2$ Variable for the water consumption (measured e.g. in m³) in the node component v after the potential switching time point during the time slice t (v∈V, t∈T); a negative value for $u_{v,t}^2$ therefore corresponds de facto to a water feed.

$w_{v,t}^{end}$ Variable for the stored water volume (measured e.g. in m³) in the node component v at the end of the time slice t (v∈V, t∈T)

$w_{v,t}^s$ Variable for the stored water volume (measured e.g. in m³) in the node component v at the time of the potential switching time point during the time slice t (v∈V, t∈T)

Mathematical model in the form of a mixed integer linear program.

The auxiliary conditions and the target function of a mixed integer linear program are introduced stepwise in the following. For this purpose firstly the required mathematical formulas are defined in each case and then an explanation of the relevant logic is given for a better understanding.

The following minimization problem is obtained using the introduced formulas and taking into account value ranges of variables:

Minimize(25)+(26)

under auxiliary conditions(1),(2), . . . ,(24)

In this statement numerically referenced equations are described in detail or derived hereinafter.

Auxiliary Conditions

In this section the auxiliary conditions of the mixed integer program are introduced, which define the permissible search area for the planning problem. Not all specified auxiliary conditions must be satisfied in all embodiments of the method and other or additional auxiliary conditions can also apply.

$$\sigma_{v,t}^{min} \leq w_{v,t}^{end} \leq \sigma_{v,t}^{max} (v \in V, t \in T) \quad (1)$$

Auxiliary condition (1) defines for all end times of the time slices t a lower and an upper limit for the quantity of water stored in the node component v. Since for all the node components apart from the tanks it holds that $\sigma_{v,t}^{min} = \sigma_{v,t}^{min} = 0$, condition (1) ensures that water can only actually be stored in tanks. For tanks a lower limit usually corresponds to a minimum or safety filling level and an upper limit corresponds to a physical capacity.

$$\sigma_{v,t}^{min} \leq w_{v,t}^s \leq \sigma_{v,t}^{max} (v \in V, t \in T) \quad (2)$$

Auxiliary condition (2) defines by analogy with (1) for all potential switching times of the edge components within all the time slices t a lower and an upper limit for the quantity of water stored in the node component v. These restrictions correspond in our model to those for the end times without restricting the generality.

$$\rho_{v,t}^{min} \cdot s_t \leq u_{v,t}^1 \leq \rho_{v,t}^{max} \cdot s_t (V \in V, t \in T) \quad (3)$$

Auxiliary condition (3) defines for all time slices t and all node components v a lower and an upper limit for the water consumption in this node averaged from the beginning of the time step up to the potential switching time of the edge components. The water consumption is measured on the basis of a product of rate and duration, for example, in cubic meters. For tanks and N-pieces the water consumption can be fixed to zero by the parameter specifications. For end users the upper and lower limits on the respectively predicted water consumption rates can be fixed in the respective time step. Consequently true interval conditions can only be obtained in the case of feeders which reflect the minimum and maximum amount of water dispensed by a water source.

$$\rho_{v,t}^{min} \cdot (\tau_t - s_t) \leq z_{v,t}^2 \leq \rho_{v,t}^{max} \cdot (\tau_t - s_t)(v \in V, t \in T) \quad (4)$$

Auxiliary condition (4) defines by analogy with (3) for all time slices t and all node components v a lower and an upper limit for the water consumption in this node averaged from the potential switching time of the edge components up to the end of the time step.

$$\phi_{e,c}^{min} \cdot d_{e,t,c}^1 \leq f_{e,t,c}^1 \leq \phi_{e,c}^{max} \cdot d_{e,t,c}^1 (e \in E, t \in T, c \in C_e) \quad (5)$$

Auxiliary condition (5) defines for all time slices t, each edge component e and each relevant operating configuration c a lower and upper limit for the respective water flow through e averaged from the beginning of the time step up to the potential switching time of the edge components within the time step. The water flow is measured on the basis of a product of rate and duration, for example, in cubic meters. If pumps are, for example, switched off (operating state "pump off"), the flow for this configuration is preferably fixed at zero with the aid of the limit parameters.

$$\phi_{e,c}^{min} \cdot d_{e,t,c}^2 \leq f_{e,t,c}^2 \leq \phi_{e,c}^{max} \cdot d_{e,t,c}^2 (e \in E, t \in T, c \in C_e) \quad (5)$$

Auxiliary condition (6) defines by analogy with (5) for all time slices t, each edge component e and each relevant operating configuration c a lower and upper limit for the respective water flow through e averaged from the potential switching time of the edge components up to the end of the time step.

$$w_{v,t_1}^s = \sigma_v^{ini} - u_{v,t_1}^1 + \Sigma_{e \in E_v^+} \Sigma_{c \in C_e} f_{e,t_1,c}^1 - \Sigma_{e \in E_v^-} \Sigma_{c \in C_e} f_{e,t_1,c}^1 \quad (v \in V) \quad (7)$$

Auxiliary condition (7) describes the water balance equation for all node components v from the start of the planning horizon (first time step) up to the first potential switching time which usually lies within the first time slice. The water volume stored in v at this first potential switching time is obtained from the initial volume $\sigma_v^{ini}$, which is increased by the flow rates through the edge components flowing into v up to this time and which is reduced by the water consumption of the node and the flow rates through the edge components flowing out of v up to this time. It should be noted here that the water consumption can also be negative, for example at a feeder. The same possibly also applies to the water flow through the edge components. The respective sign ensures that the relevant quantities of water contribute correctly to the water balance equation. With a view to the water flow through the edge components, it should be additionally noted that as a result of the auxiliary conditions (10), (13), and (5) it can be ensured that when summing overall operating states, in each case only at most one summand not equal to zero can be obtained since each edge component up to the first switching time can only be located in a single operating state.

$$w_{v,t}^{end} = w_{v,t}^s - u_{v,t}^2 + \Sigma_{e \in E_v^+} \Sigma_{c \in C_e} f_{e,t,c}^2 - \Sigma_{e \in E_v^-} \Sigma_{c \in C_e} f_{e,t,c}^2 \quad (v \in V, t \in T) \quad (8)$$

Auxiliary condition (8) has the same balancing logic as auxiliary condition (7). In this case however, it describes for all node components v and all time slices t the transition of the water volume stored in v from the time of the potential switching time within the time slice up to the end of the relevant time slice.

$$w_{v,t}^s = w_{v,\theta_t^{-1}}^{end} - u_{v,t}^1 + \Sigma_{e \in E_v^+} \Sigma_{c \in C_e} f_{e,t,c}^1 - \Sigma_{e \in E_v^-} \Sigma_{c \in C_e} f_{e,t,c}^1 \quad (v \in V, t \in T \setminus \{t_1\}) \quad (9)$$

Auxiliary condition (9) also has the same balancing logic as auxiliary condition (7). In this case however, it describes for all node components v and all time slices t with the exception of the first time slice the transition of the water volume stored in v from the end time of the preceding time slice $\theta_t^{-1}$ up to the potential switching time of the following time slice t.

$$k_{e,t_1,\kappa_e^{ini}}^1 = 1 (e \in E) \quad (10)$$

Auxiliary condition (10) fixes for all edge components e the operating configuration at the beginning of the first time slice on the initial operating state $\kappa_e^{ini}$.

$$\Sigma_{c \in C_e} k_{e,t,c}^1 = 1 (e \in E, t \in T) \quad (11)$$

Since the variables $k_{e,t,c}^1$ are binary variables which can only have the value 0 or 1, auxiliary condition (11) states that there must always be precisely one uniquely defined operating configuration c for each edge component e, which is active from the respective beginning of a time slice t up to the relevant potential switching time within the time slice. All other possible operating configurations of the edge component e thus remain inactive in this time interval.

$$\Sigma_{c \in C_e} k_{e,t,c}^2 = 1 (e \in E, t \in T) \quad (12)$$

Auxiliary condition (12) is analogous with auxiliary condition (11), but treats in this case the time interval from the potential switching time up to the end of the respective time slice. Together with (11), (12) thus states that in each time slice at most two operating configurations can be active, namely one before and one after the potential switching time. If the same configuration is involved here, effectively switching cannot take place and there is only one active configuration in this time slice.

$$d_{e,t,c}^1 \leq \tau_t \cdot k_{e,t,c}^1 (e \in E, t \in T, c \in C_e) \quad (13)$$

Auxiliary condition (13) forms for the first subsection of each time slice t, i.e. the time interval from the start up to the potential switching time of the current time slice t, an upper limit for the duration over which the edge component e is located in the operating configuration c. If the configuration c is not active in this time interval (i.e. $k_{e,t,c}^1 = 0$), this duration is automatically fixed at 0. If it is active, it can be at most the length of the time slice t. Since as a result of (11), only one configuration is active, at most one configuration can thus also be assigned a positive duration.

$$d_{e,t,c}^2 \leq \tau_t \cdot k_{e,t,c}^2 (e \in E, t \in T, c \in C_e) \quad (14)$$

Auxiliary condition (14) is formulated by analogy with auxiliary condition (13) and treats in this case however the respectively second section of each time slice t, i.e. that from the potential switching time up to the end of the time slice.

$$\Sigma_{c \in C_e}(d_{e,t,c}^1 + d_{e,t,c}^2) = \tau_t (e \in E, t \in T) \quad (15)$$

Auxiliary condition (15) ensures for all edge components e and all time slices t that both durations of the active operating configurations of the edge component e for the time intervals before and after the potential switching time are each added to the total duration of the time slice so that it is ensured that at each time point in the planning horizon precisely one operating configuration is active.

$$s_t = \Sigma_{c \in C_e} d_{e,t,c}^1 (t \in T) \quad (16)$$

Auxiliary condition (16) is used to determine the potential switching time for each time slice t. As a result of (10) and (13), only a single one of the summands can be not equal to zero. The duration pertaining to this summand for the active time of the corresponding operating configuration corresponds to the switching time within the time slice measured since the beginning of the time slice.

$$m_{e,t} \geq k_{e,t,c}^1 - k_{e,t,c}^2 (e \in E, t \in T, c \in C_e) \quad (17)$$

$$m_{e,t} \geq k_{e,t,c}^2 - k_{e,t,c}^1 (e \in E, t \in T, c \in C_e) \quad (18)$$

The auxiliary conditions (17) and (18) combined form a lower limit for the number of switchings within a time slice, i.e. it is checked whether a switching actually took place or not for the edge component e at the potential switching time within the time slice t. If no switching took place, the variables $k_{e,t,c}^1$ and $k_{e,t,c}^2$ have the same value for all the operating configurations c and the lower limit has the value 0. If on the other hand a switching did take place, the values for the variables $k_{e,t,c}^1$ and $k_{e,t,c}^2$ differ precisely for the two active operating configurations. The two differences on the right-hand sides of the inequalities (17) and (18) are then therefore 1 and −1, so that overall the lower limit 1 is obtained. Since a switching with costs can be confirmed in the target function, which then need to be minimized, the values of the variables $m_{e,t}$ in the calculated solution are preferably always selected to be minimal, i.e. identical to the relevant lower limit. It therefore follows from the optimization that the variables $m_{e,t}$ always have the value 0 or the value 1 in the optimal solution without explicitly having been declared as binary.

$$n_{e,t} \geq k_{e,t,c}^1 - k_{e,\theta_t^--1,c}^2 (e \in E, t \in T\setminus\{t_1\}, c \in C_e) \quad (19)$$

$$n_{e,t} \geq k_{e,\theta_t^--1,c}^2 - k_{e,t,c}^1 (e \in E, t \in T\setminus\{t_1\}, c \in C_e) \quad (20)$$

The pair of auxiliary conditions (19) and (20) has the same logic as the pair of auxiliary conditions (17) and (18). The only difference is that here the switchings are not checked within the time slices but during the transition from the preceding time slice to its following time slice. Since a direct switchover of the initial operating configuration at time 0 is usually not provided (at most as switching "within" the time slice), the first time slice is placed outside the brackets in each case in the auxiliary conditions (19) and (20).

$$g_{e,t,c}^1 = \pi_{e,c}^{min} \cdot d_{e,t,c}^1 \cdot \frac{1}{3600} \cdot \frac{h}{s} (e \in E, t \in T, c \in C_e: \phi_{e,c}^{min} = \phi_{e,c}^{max}) \quad (21)$$

Auxiliary condition (21) defines for each time slice t the energy consumption up to the potential switching time, which accompanies the operation of the edge component e in the operating configuration c if c prescribes a unique operating point, in particular with regard to a flow rate and therefore also with regard to a power. This is calculated from the product of the power pertaining to c and the activity duration of this operating configuration. It should also be noted that the time unit must be converted from seconds into hours to give the energy in kWh.

$$g_{e,t,c}^1 = \left(\pi_{e,c}^{min} \cdot d_{e,t,c}^1 + \frac{\pi_{e,c}^{max} - \pi_{e,c}^{min}}{\phi_{e,c}^{max} - \phi_{e,c}^{min}} \cdot (f_{e,t,c}^1 - \phi_{e,c}^{min} \cdot d_{e,t,c}^1)\right) \cdot \frac{1}{3600} \cdot \frac{h}{s} \quad (22)$$

$$(e \in E, t \in T, c \in C_e: \phi_{e,c}^{min} \neq \phi_{e,c}^{max})$$

Auxiliary condition (22) defines for each time slice t the energy consumption up to the potential switching time which accompanies operation of the edge component e in the operating configuration c, if c prescribes, instead of a unique operating point, a true interval of possible operating points, in particular with regard to a flow rate and therefore also with regard to a power.

The idea behind the equation consists in assuming that for the power suitable for the selected flow rate $f_{e,t,c}^1$ this occupies the same relative position within the power interval $[\pi_{e,c}^{min}, \pi_{e,c}^{max}]$ as the flow rate pertaining to $f_{e,t,c}$ in the flow rate interval $[\phi_{e,c}^{min}, \phi_{e,c}^{max}]$. If the corresponding flow rate therefore lies precisely at the center of the relevant interval, then the power also lies in its relevant interval. This factual content is implemented by the linear equation contained in (22). From the power thus obtained the relevant energy consumption can furthermore be determined by multiplication with the duration. In so doing it should be noted that for $f_{e,t,c}^1$ this multiplication can already be accomplished implicitly in auxiliary condition (5). Here also by analogy with (21), a conversion of the time unit from seconds into hours can be necessary to obtain the power in kWh.

$$g_{e,t,c}^2 = \pi_{e,c}^{min} \cdot d_{e,t,c}^2 \cdot \frac{1}{3600} \cdot \frac{h}{s} (e \in E, t \in T, c \in C_e: \phi_{e,c}^{min} = \phi_{e,c}^{max}) \quad (23)$$

Auxiliary condition (23) is the analog to auxiliary condition (21) for the time interval from the potential switching time up to the end of the relevant time slice t.

$$g_{e,t,c}^2 = \left(\pi_{e,c}^{min} \cdot d_{e,t,c}^2 + \frac{\pi_{e,c}^{max} - \pi_{e,c}^{min}}{\phi_{e,c}^{max} - \phi_{e,c}^{min}} \cdot (f_{e,t,c}^2 - \phi_{e,c}^{min} \cdot d_{e,t,c}^2)\right) \cdot \frac{1}{3600} \cdot \frac{h}{s} \quad (24)$$

$$(e \in E, t \in T, c \in C_e: \phi_{e,c}^{min} \neq \phi_{e,c}^{max})$$

Auxiliary condition (24) is the analog to auxiliary condition (22) for the time interval from the potential switching time up to the end of the relevant time slice t.

Target Function

In this section the target function to be optimized is defined. As already introduced above, the target function is assumed to be a cost function which is to be minimized.

$$\Sigma_{e \in E} \omega_e^{sw} \cdot (\Sigma_{t \in T} m_{e,t} + \Sigma_{t \in T\setminus\{t_1\}} n_{e,t}) \quad (25)$$

Formula (25) describes the costs associated with the switchings of all the edge components e. For this for each edge component e the number of all the switchings determined with the variables $m_{e,t}$ and $n_{e,t}$ is multiplied by the relevant cost rate $\omega_e^{sw}$ and then the sum over all the edge components is formed. De facto however only the minimizing of the switchings of pumps is of interest and preferably therefore $\omega_e^{sw}=0$ is selected for all edge components which are not pumps or turbines.

$$\Sigma_{e \in E} \Sigma_{t \in T} \omega_{e,t}^{en} \cdot (\Sigma_{c \in C_e} (g_{e,t,c}^1 + g_{e,t,c}^2)) \quad (26)$$

Formula (26) describes the energy costs resulting from the operating strategy of the edge components. For this the energy consumption of each edge component e in every possible operating configuration c and in each time step t is calculated (this corresponds to $g_{e,t,c}^1 + g_{e,t,c}^2$) and then multiplied by the corresponding energy cost rate $\omega_{e,t}^{en}$. Then the sum of all the individual costs in the individual time steps and for all the edge components is formed to obtain the total energy costs.

Possibilities for Extension and Adaptation for New Model Variants

The approach of determining the operating strategy of a water supply network with the aid of a mixed integer linear program offers the advantage of high flexibility, which is shown in particular by a plurality of possibilities for adaptation when defining auxiliary conditions and the design of a target function.

Optional extensions of the above-described procedure are briefly presented in the following. The options are purely exemplary and are representative for a plurality of possible variants and embodiments of the method. A detailed mathematical formulation is dispensed with in this section.

Synchronization of Operating Configurations of the Edge Components

Instead of optimizing all the edge components individually as individual and independent components, it can be appropriate, for example, to combine pumps into pumping stations for which operating configurations can also be defined. For example for a pumping station with three functionally the same pumps A, B, and C, the configurations can be defined as "all pumps off", "only pump A on", "pumps A and B on", and "all pumps on". The introduction of such a pumping station can serve both to allow only technically meaningful state combinations of edge components and also help to save computing time for the optimization since, for example, equivalent state combinations of edge components (symmetries) can be avoided. The combinatorics of the planning problem can thereby possibly be drastically reduced. A corresponding group formation is also feasible for combinations of any other edge components.

Combination of Several Operating Configurations in State Classes

In addition to this extension idea, a specific operating configuration of the edge components can also be combined in a state class. For example, for a pumping station with three different pumps A, B, and C, the state class "precisely one pump is active" could be introduced in which the three specific operating configurations "only pump A is on", "only pump B is on", and "only pump C is on" are combined. This can also be very helpful when defining the technically meaningful combinations of operating configurations of the edge components to reduce the combinatorics.

Predefined Active State Classes

In some planning instances it can be desirable not to grant the optimizer complete freedom of decision over specific aspects of the solution. Instead, it can be desirable to already fixedly predefine some decisions by a fixing or partial fixing. An example for this would be a maintenance of a pumping station in which all the pumps must be switched off. In this case, the maintenance can be placed on one or more corresponding time slices and there operating configurations of all pumps can be predefined to "pump off". The same can be carried out for the above-described state classes. Thus, for a pumping station it could simply be required that in the time slices pertaining to the maintenance the state class "all pumps off" must be active. The relevant state fixings or state partial fixings can then be notified to the optimizer as additional auxiliary conditions so that these specifications must be taken into account in the optimization.

Distinguishing of Switchings

In the model introduced above there is initially only one overall type of switching. In practice however it can be interesting that it is more important to avoid on/off switchings of the pumps than switchings between different operative operating configurations. This can also be integrated into the specified model by introducing different switching variables which are provided with correspondingly different cost rates in the target function.

Water Costs

Naturally the water consumption in the node components (in particular the feeders) can also be evaluated by means of a cost function and integrated in the target function so that the costs associated with the flow of water are also included in the optimization. This requires on the data input side corresponding cost rates for water per volume for the different feeders. In this case, time series can also be supported if the prices are not constant in time.

Turbines for Power Generation

In our model description only three types of edge components were introduced: pipes, valves, and pumps. This approach can easily be expanded by turbines. Turbines are interpreted as "inverse pumps" and thus also allow the integration of an energy recovery possibility. The "energy consumption" associated with turbines should therefore be modeled as negative.

Daily Total Amount of Water Dispensed by Water Sources

In addition to the water dispensing rates dependent on the time slices, the overall capacity for the water dispensing of feeders valid in the planning horizon being considered can also be modeled and included in the optimization, e.g. by specifying a maximum daily total amount dispensed.

Restriction of the Energy Availability

In the above model the energy required to operate the pumps is assumed to be available unrestrictedly. Naturally upper limits for the energy consumption can also be integrated into the model. For this purpose, for example, an assignment of the pumps to energy suppliers could be increased, which in the planning horizon only ensure a specific maximum output power.

Tanks Only Connected by Pipes

As a result of a lack of allowance for water pressures in the water supply network and the time aggregation, the model presented is a possibility for coarse planning of the water supply network or its control. Nevertheless, further physical framework conditions can also be integrated in this model, the lack of which can otherwise lead to unrealistic planning results. An example for this are tanks which are exclusively interconnected via pipes. In this case additional conditions can be introduced which ensure that the filling level of these tanks must then always correspond to the same level above normal zero.

Analysis of Impermissible Planning Scenarios

The mathematical model described contains numerous upper and lower limits, which specify the value ranges for the variables. It is therefore easy to produce instances, which have no permissible solution because the selected limits do not match one another. In this case, so-called soft constraints can be made from the hard, i.e. invariable auxiliary conditions by incorporating a violation of the limits but this exceeding is subjected to very high costs in the target function. In this way, when planning a water supply network, a partial network, or a component it is possible to obtain a statement as to which control variables should be adjusted to arrive at an operational installation architecture in the case of an impermissible instance with the fewest possible adaptations.

Although the invention has been illustrated and described in detail by the preferred exemplary embodiment, the invention is not restricted by the disclosed examples and other variations can be deduced herefrom by the person skilled in the art without departing from the scope of protection of the invention.

The invention claimed is:

1. A method for controlling a water supply network, which comprises node components and edge components, wherein the edge components transport water between the node components, wherein at least one of the edge components is controllable in relation to its flow behavior for water and wherein the method comprises the following steps:

determining a planning horizon, which comprises a number of time slices;

determining upper and lower limits for feeds of water into the water supply network in the time slices;

determining prospective withdrawals of water from the water supply network in the time slices;

determining possible operating configurations of the at least one edge component;

determining energy costs for an activation of the controllable edge components in the time slices;

determining permissible states of node components of the water supply network;

determining initial states of components of the water supply network;

determining a control plan for the at least one controllable edge component on the basis of the determined information in such a manner that a predetermined water balance of the water supply network is maintained in each time slice averaged over time; and controlling the water supply network based on the control plan;

wherein the control plan comprises a time sequence of activations of the at least one edge component;

wherein the control plan allows a transition between different activations of the at least one edge component only once in each time slice and once at a transition from one time slice to the following time slice.

2. The method as claimed in claim 1, wherein further transitions between different activations of a plurality of edge components are allowed in each time slice and wherein the further transitions take place simultaneously.

3. The method as claimed in claim 1, wherein the control plan is created for a plurality of controllable edge components and the time sequences of the activations of the edge components are coordinated.

4. The method as claimed in claim 1, wherein the control plan is determined in such a manner that a quantity of water stored in a time slice at one node component corresponds to the quantity of water stored in the node component in a preceding time slice plus an inflowing quantity of water and minus an outflowing quantity of water.

5. The method as claimed in claim 1, wherein an operating configuration comprises a permissible flow rate of water and a permissible energy consumption of a controllable edge component.

6. The method as claimed in claim 1, wherein the node components comprise a tank and a state of the tank relates to an interval of permissible filling levels.

7. The method as claimed in claim 1, wherein the at least one edge component comprises an active device, the energy intake of which is dependent on its activation and wherein the control plan is determined in such a manner that the sum of the energy intakes of all the edge components is as small as possible over the entire planning horizon.

8. The method as claimed in claim 1, wherein the control plan is determined in such a manner that costs which are assigned to the switchings of an edge component are minimized as far as possible.

9. The method as claimed in claim 1, wherein the at least one edge component comprises at least one active device and the time sequences of the activations of the edge components are determined such that a total power of the active edge components does not exceed a predetermined power.

10. The method as claimed in claim 1, wherein one of the controllable edge components comprises an active device, whose energy intake can be negative.

11. The method as claimed in claim 1, wherein the control plan is determined by means of a mixed integer linear program.

12. A device for controlling a water supply network, which comprises node components, edge components, and a processing device, wherein the edge components transport water between the node components, wherein at least one of the edge components is controllable in relation to its flow behavior for water, and wherein the processing device is adapted to determine:

in a number of time slices into which a planning horizon is divided, on the basis of upper and lower limits for feeds of water into the water supply network and prospective withdrawals of water from the water supply network in the time slices;

possible operating configurations of the at least one edge component;

energy costs for an activation of the controllable edge components in the time slices;

permissible states of node components of the water supply network;

and initial states of components of the water supply network;

a control plan for at least one controllable edge component in such a manner that a predetermined water balance of the water supply network is maintained in each time slice averaged over time;

wherein the control plan allows a time sequence of transitions between different activations of the at least one controllable edge component only once in each time slice and once at a transition from one time slice to the following time slice.

13. The device as claimed in claim 12, further comprising an interface for connection to the at least one edge component, wherein the processing device is adapted to activate the edge component depending on the determined control plan.

* * * * *